No. 631,521. Patented Aug. 22, 1899.
J. A. ELLIOTT.
COMBINED HARROW AND CULTIVATOR.
(Application filed Feb. 16, 1899.)
(No Model.) 2 Sheets—Sheet 1.
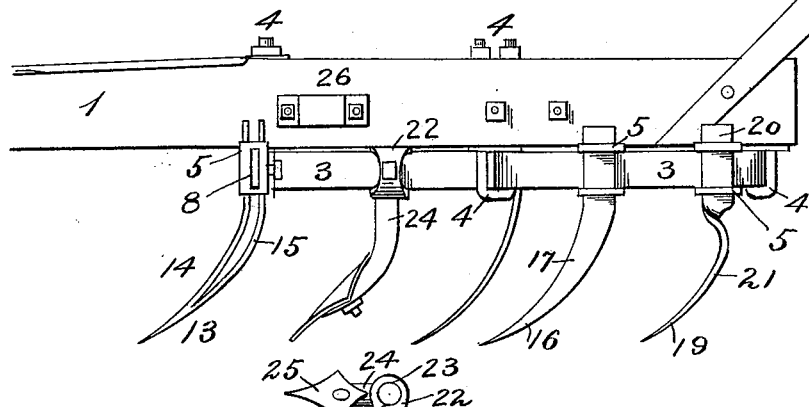
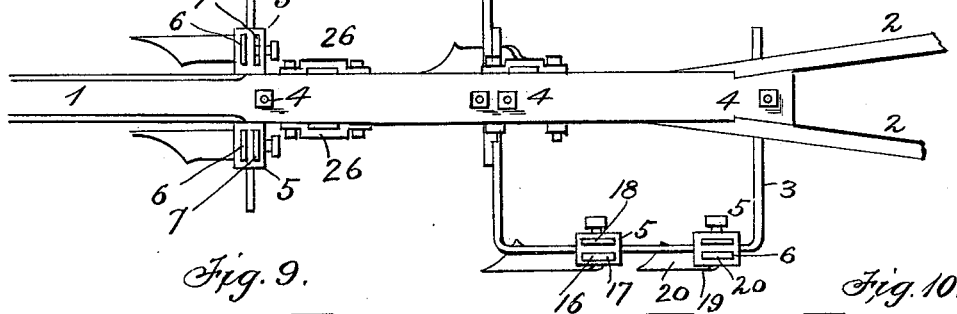
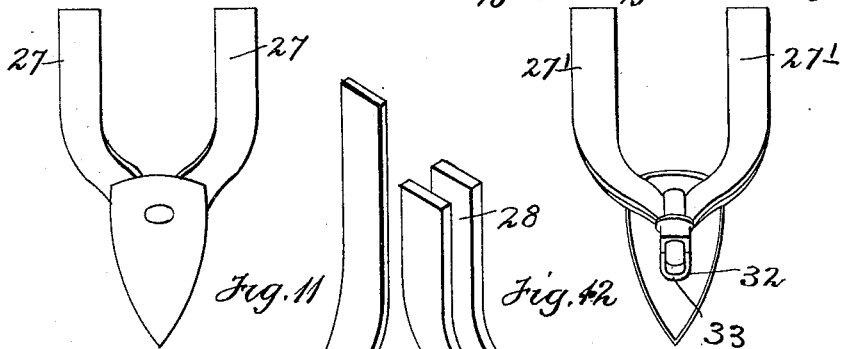
WITNESSES: INVENTOR
*T. J. Duffie* *Jas. A. Elliott*
*S. A. Duffie* BY
 *John S. Duffie*
 ATTORNEY.

No. 631,521. Patented Aug. 22, 1899.
J. A. ELLIOTT.
COMBINED HARROW AND CULTIVATOR.
(Application filed Feb. 16, 1899.)
(No Model.) 2 Sheets—Sheet 2.
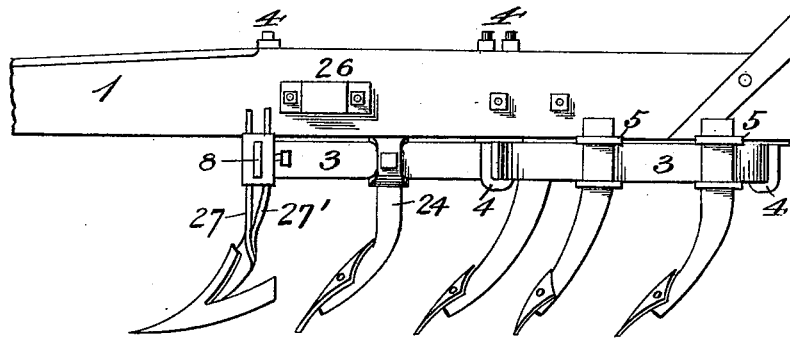
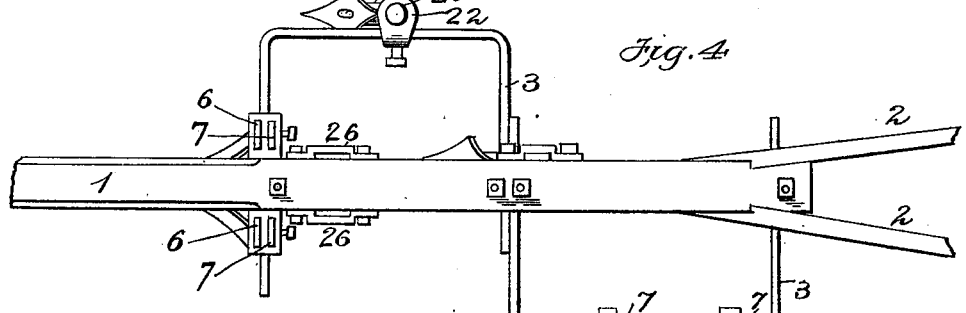
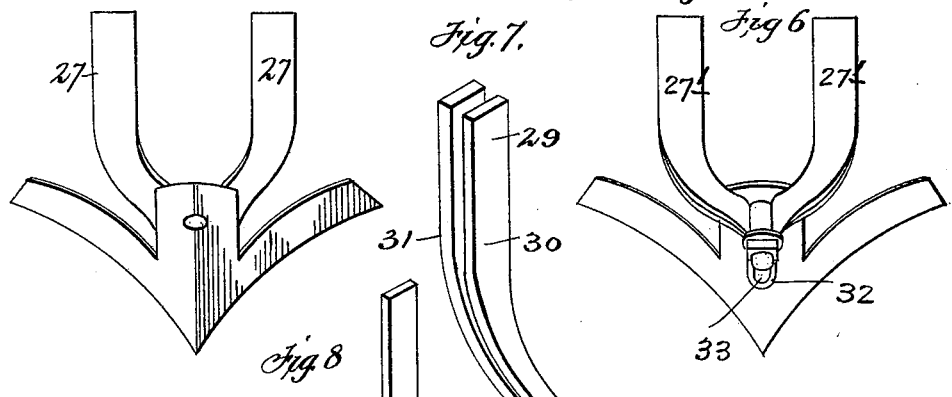
WITNESSES: INVENTOR
                  BY
                        ATTORNEY.

UNITED STATES PATENT OFFICE.

JAMES ALLEN ELLIOTT, OF ANDERSON, SOUTH CAROLINA, ASSIGNOR TO WALTER S. BROCK, OF SAME PLACE, AND JOHN W. BROCK, OF HONEA PATH, SOUTH CAROLINA.

COMBINED HARROW AND CULTIVATOR.

SPECIFICATION forming part of Letters Patent No. 631,521, dated August 22, 1899.

Application filed February 16, 1899. Serial No. 705,607. (No model.)

*To all whom it may concern:*

Be it known that I, JAMES ALLEN ELLIOTT, a citizen of the United States, residing at Anderson, in the county of Anderson and State of South Carolina, have invented certain new and useful Improvements in Combination Harrows and Cultivators, of which the following is a specification.

My invention is a combination which may be converted into a cultivator or a harrow or into part cultivator and part harrow; and it consists of a plow-beam, handles, side frames, clamps for holding the plow-standards, and harrow-teeth.

In the accompanying drawings, Figure 1 is a side elevation of my invention constructed as a harrow. Fig. 2 is a top plan view of Fig. 1. Fig. 3 is a side elevation of my invention when constructed as a cultivator. Fig. 4 is a top plan view of Fig. 3. Fig. 5 is a front view of a double standard and sweep. Fig. 6 is a rear view of Fig. 5. Fig. 7 is a perspective view of one of my plow-standards. Fig. 8 is a perspective view of another one of my plow-standards with foot attached, which may also be used as a harrow-tooth. Fig. 9 is a front view of the double standard as shown in Fig. 5 with a scooter attached. Fig. 10 is a rear view of Fig. 9. Fig. 11 is a perspective view of one of my harrow-teeth, and Fig. 12 is a perspective view of another one of my plow-feet.

In the accompanying drawings, 1 is a plow or harrow beam.

2 are the handles.

3 are U-shaped frames, preferably of bar-steel, which are held to the lower edge of the beam 1 by U-shaped bolts and nuts 4.

5 are clamps provided with three openings 6, 7, (see Fig. 2,) and 8. (See Fig. 1.)

The frames 3 pass through the opening 8 in the clamps 5, leaving two openings 6 and 7 on either side of the frame to receive the upper ends of the harrow-teeth. These harrow-teeth may be variously constructed, but are preferably constructed as shown in Fig. 1. In Fig. 1 the front teeth 13 have a front or main part 14 and a rear or brace part 15. The tooth 16 opens longitudinally—that is, in relation to the plow-beam. It has an outside part 17 and an inside part 18. The tooth 19, though secured by a clamp 5, is constructed of only one piece, its body part 20 passing through the outer opening 6 of the clamp 5, (see rear clamp, Fig. 2,) and just below the lower edge of the said clamp it is twisted and curved, forming a foot 21. In securing these teeth 19 it is only necessary that my clamp have two openings—8 for the frame to pass through and 7 for the shank to pass through.

I sometimes use in connection with my combination cultivator and harrow a clamp 22. (See Figs. 2 and 4.) This clamp is made in every respect like clamps 5, except it has but two openings—one for the frame, which is equivalent to opening 8 in clamps 5, and another opening 23, which is equivalent to opening 6 in clamp 5, only it is round to accommodate a cylindrical standard 24. (See Figs. 2 and 4.) This standard 24, and indeed all of the plow-standards, may be provided with double-pointed points 25, so that when one end wears out the other end may be turned down.

In the manufacture of my invention I also use side clamps 26, so that when I do not use the double plow-standard 27 I may use a plow-standard 28, as shown in Fig. 12, one of its arms passing up through one clamp 26 on one side of the beam and the other arm through clamp 26 on the other side of the beam, thus giving me a central plow-standard at that point. The standard 28 may be used in any one of the clamps 5 except the two clamps used on the front arm of the front frame. In these two clamps I use the plow-foot 29, (shown in Fig. 7,) which has a front part 30 and a rear or brace part 31. These rear or brace parts are to strengthen the harrow or cultivator standards when they present their flat surface to the front. The double cultivator-standard 27, as shown in Figs. 5, 6, 9, and 10, is bent at its lower end, forming a U 32, presenting the edges of the bar to the front and rear and leaving a slot 33, so that the sweeps, scooters, or other points may be adjustably secured to the foot of said standard. The upper posts of said standards are twisted so as to present their flat sides to the front and rear and are passed up through the openings 6 in the clamps 5. This standard ordinarily has no rear brace, because, being double, it is strong enough, except when the cultivator is used as a plow to break up very heavy ground, in which case it is made with a brace 27', as shown in Fig. 3. It may be observed that all these harrow-teeth and cultivator-standards are interchangeable except the standard 24 used in the clamp 22, and that I may therefore convert my combination into all harrow or into all cultivator or part harrow and part cultivator.

Having described my invention, what I claim as new, and desire to secure by Letters Patent, is—

1. The combination of the beam 1, provided with handles 2 and clamps 26; U-shaped frames 3 secured to the said beam by U-shaped bolts 4; clamps 5, provided with openings 6, 7, and 8; clamp 22, adapted to be secured to the bars 3, and provided with a circular opening 23, said frame and clamps adapted to carry harrow-teeth or cultivator-standards, substantially as shown and described and for the purposes set forth.

2. The combination of the beam 1; frames 3; bolts 4; clamps 5, having openings 6, 7, and 8, adapted to alternately carry harrow-teeth and cultivator-standards, substantially as shown and described and for the purposes set forth.

3. In a combination harrow and cultivator frame, the clamps 5 and double standard 27 provided with the U-shaped bend 32 and rear brace 27', substantially as shown and described and for the purposes set forth.

In testimony whereof I affix my signature in presence of two witnesses.

JAMES ALLEN ELLIOTT.

Witnesses:
CLYDE A. WELCH,
W. O. MELGROVE.